United States Patent [19]

Baggiolini et al.

[11] 3,800,518
[45] Apr. 2, 1974

[54] LETTUCE HARVESTER

[75] Inventors: Primo Baggiolini, Salinas; James Edward Muscio; Michael Silvio Franscioni, both of Gonzales, all of Calif.

[73] Assignee: Agriframe, Inc., Gonzales, Calif.

[22] Filed: Oct. 20, 1971

[21] Appl. No.: 190,937

[52] U.S. Cl.................... 56/327 R, 171/38, 171/61
[51] Int. Cl............................................ A01d 45/00
[58] Field of Search................ 56/327 R; 171/38, 61

[56] References Cited
UNITED STATES PATENTS

| | | | |
|---|---|---|---|
| 3,300,954 | 1/1967 | Barnes et al. | 56/327 R |
| 3,380,237 | 4/1968 | Garrett | 56/327 R |
| 3,442,071 | 5/1969 | Duda, Jr. | 56/327 R |
| 3,586,108 | 6/1971 | Wedgeworth | 56/327 R |
| 3,035,387 | 5/1962 | Bevill | 171/61 UX |
| 2,855,058 | 10/1958 | Krier et al. | 171/38 X |
| 3,168,145 | 2/1965 | Gunkel et al. | 171/61 |

Primary Examiner—Louis G. Mancene
Assistant Examiner—J. A. Oliff
Attorney, Agent, or Firm—Burns, Doane, Swecker & Mathis

[57] ABSTRACT

Vehicle mounted apparatus for harvesting lettuce. The harvesting apparatus includes a ground engageable skid having a knife positioned for severing the lettuce head from its root. The skid gauges the cutting height of the knife relative to the ground. The harvesting apparatus also includes a sensing device having a pair of opposed rollers to sense the size and firmness of lettuce heads as the vehicle moves along the row of lettuce. These rollers are driven at ground speed. The lettuce heads pass between the rollers and when the head engaged by the rollers has the proper size and firmness, the cutting knife is actuated to cut the root supporting the head. A pair of endless conveyors on the vehicle is positioned to receive the severed head and to transport the head to a level suitable for subsequent processing.

10 Claims, 9 Drawing Figures

INVENTORS
PRIMO BAGGIOLINI
JAMES E. MUSCIO
MICHAEL S. FRANSCIONI

BY Burns, Doane,
Swecker & Mathis
ATTORNEYS

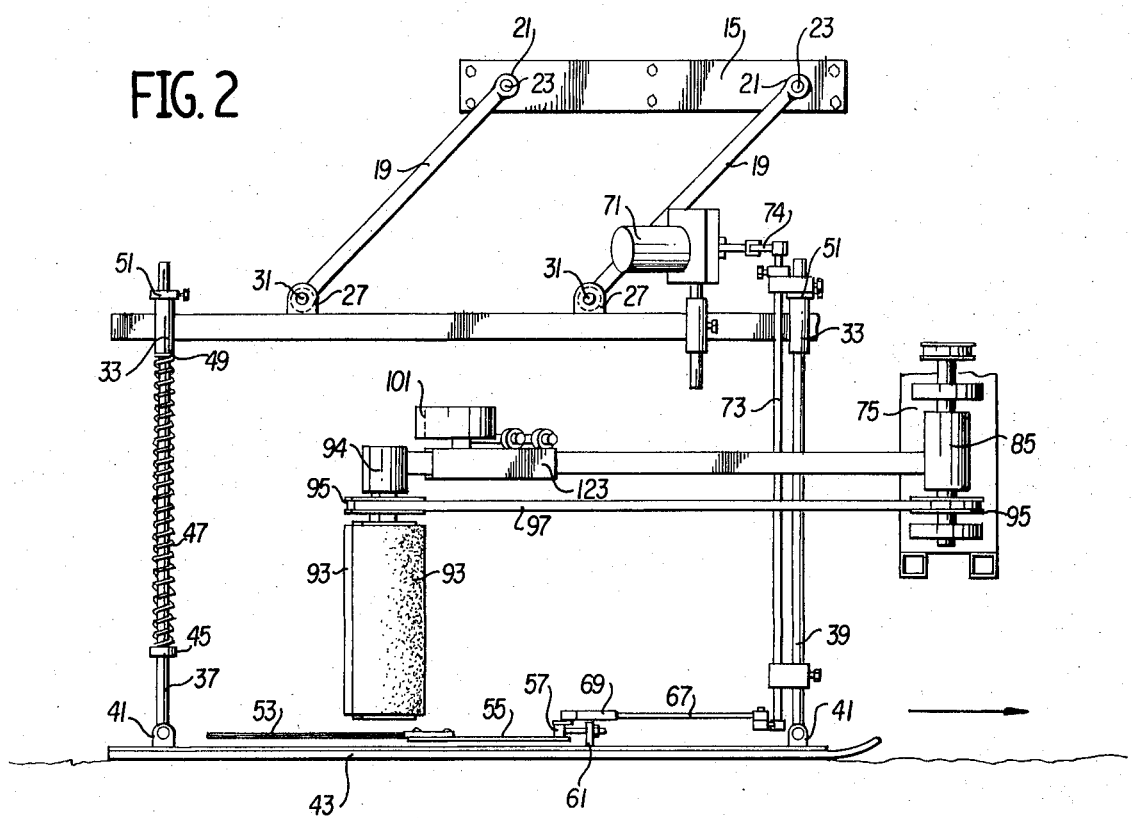

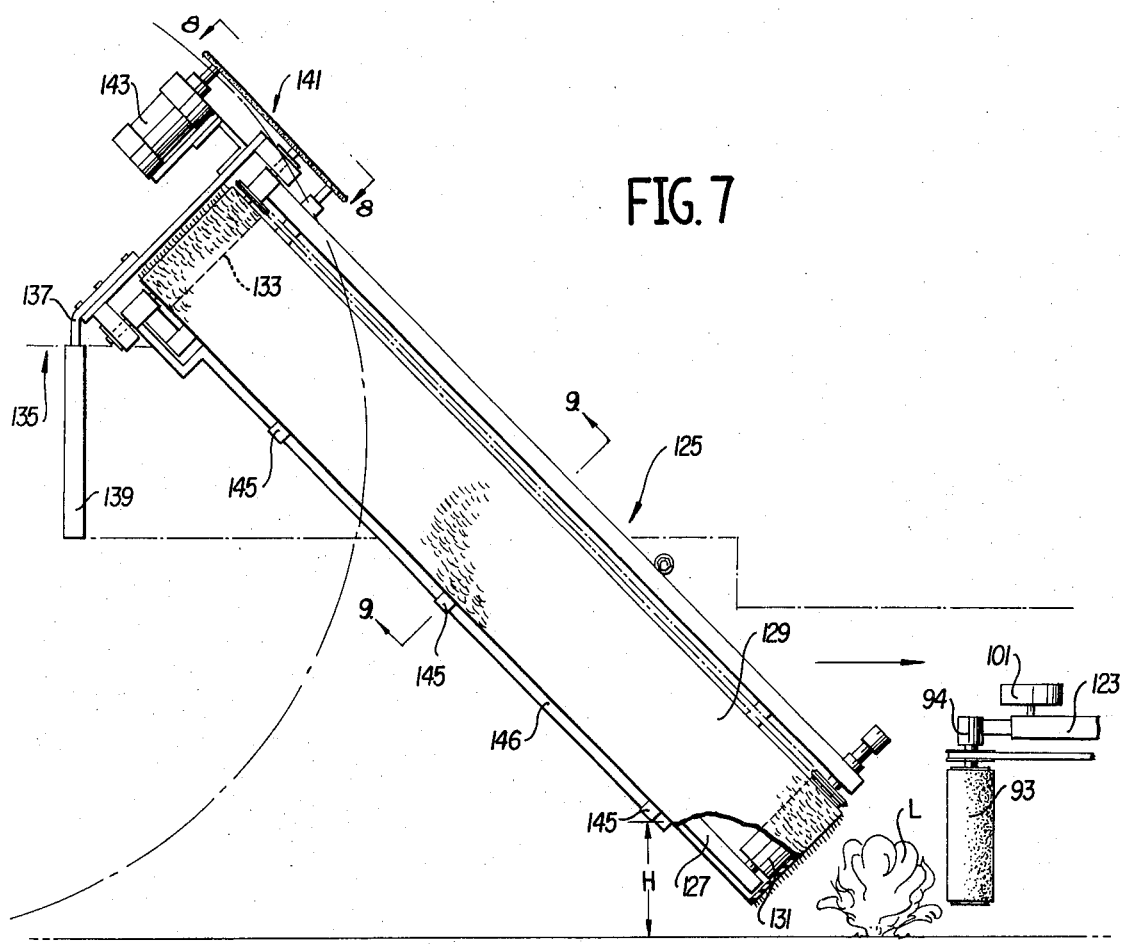
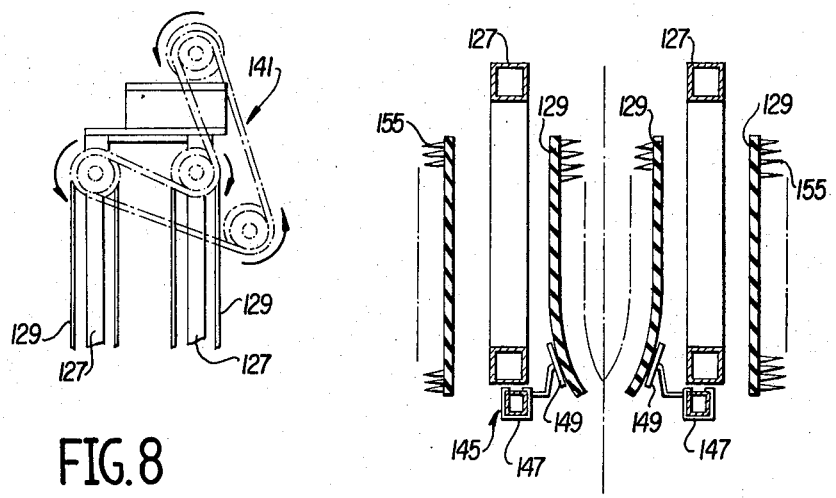

LETTUCE HARVESTER

BACKGROUND OF THE INVENTION

This invention relates to a crop harvesting apparatus and, more particularly, to apparatus for harvesting mature lettuce heads from a field.

The harvesting of lettuce has previously been a task which must be performed by manual labor. Lettuce characteristically matures in an irregular pattern in the field and is most economically harvested in stages so that immature lettuce heads are left for subsequent removal. A field may be harvested from one to three times depending on how evenly the lettuce matures and on market conditions. While some of the heads are selected by the worker upon visual inspection, head maturity is generally evaluated by feeling the head to determine its firmness. It is expensive to employ laborers to harvest lettuce by this manual process.

The arrangement of lettuce fields, with lettuce growing in generally parallel rows on mounds of earth, suggests that mechanical harvesting devices may be employed to perform the tasks previously done by hand. Harvesting machines which sever lettuce at their roots have long been known. Additionally, devices for transporting the harvested crop for subsequent handling are also known in the art. A more recent attempt at automating the harvesting of lettuce and the like has been the employment of a mechanical sensing apparatus in combination with the cutting and lifting operations in an attempt to minimize the dependence on manual labor. Machines which attempt to deal with the problems of harvesting lettuce are those such as Barnes et al, U. S. Pat. No. 3,300,954; Barnes, U. S. Pat. No. 3,300,955; and Garrett, U. S. Pat. Nos. 3,380,234 and 3,380,237. These patents disclose various sensing, cutting and lifting devices designed to mechanize the aforedescribed lettuce harvesting operations.

There are three necessary functions which must be performed by a commercially feasible and desirable lettuce harvesting device in order to adequately handle the harvesting of this produce. The first of these necessary functions involves the determining of whether or not a given head of lettuce is ripe for cutting. The second of the harvesting functions involves the selective cutting of these mature heads at their base to avoid damage to the harvested heads. The third of the harvesting functions involves the movement of the severed head from its ground level growing position to a position above where a packing platform or other handling device is located. All of these functions are most desirably performed by an apparatus which handles the crop gently to avoid damaging it and is efficient in its operation so that only mature heads will be accurately and speedily harvested. Additionally, it is desirable that the harvesting apparatus be easy to maintain and be provided with adequate adjustment features to handle the variations in lettuce growing conditions which may be encountered.

The above-noted Barnes and Barnes et al patents utilize a sensing device which employs small stationary rollers which sense the firmness of lettuce heads by the lateral displacement of these rollers when the lettuce heads pass therebetween. The sensing device in the Barnes and Barnes et al patents also employ a conventional variable tension spring for keeping the opposed rollers generally parallel to one another. The use of small rollers may, however, cause excessive damage to the lettuce heads as they are being sensed. In addition, the generally stationary rollers when traversing the field with a harvesting vehicle may tend to twist the lettuce heads off at their roots when coming into contact with the stationary lettuce heads. Also, the variable tension spring may not accuratley determine lettuce firmness when variations in size of the lettuce heads were encountered due to the uneven forces applied by these springs according to Hooks law. A sensing unit which senses firmness between the top of the lettuce and the ground such as that disclosed in the Garrett patents has also been found to be undesirable.

Cutting devices for severing the lettuce heads from their bases have also been found to be undesirable in prior art lettuce harvesting devices such as those disclosed above. It is preferable that the lettuce heads be cut adjacent the ground below the head so that the heads are not damaged in this cutting operation. It can thus be appreciated that precision in the positioning of any cutter is important in preventing damage to the harvested crop. Any possible miscutting may chop the heads into pieces rather than sever them cleanly. Also, any cutting should avoid the somewhat higher beds on which the lettuce heads are growing so that contact with the dirt of these beds is minimized.

Severed mature lettuce heads, as previously noted, are generally transported to a location somewhat remote from the ground for subsequent sorting or packing. Some of the prior art devices attempt to deal with this problem by utilizing precisely timed lifting clamps or head batting devices which move the heads to a position from which they could be lifted by a separate device. The above-noted Barnes patent utilizes a combination lifting and basket-like cutter to perform this lifting operation. Devices of this type are generally relatively complicated and may cause injury to the lettuce heads as they are moved from the ground. In addition, the prior art devices do not keep the severed heads in a uniform upright position in their transfer from the ground growing locations. This alignment is preferable when on the field packing is to be performed.

OBJECTS AND SUMMARY OF THE INVENTION

It is a general object of the invention to provide an improved harvesting apparatus and method which selects, cuts and transports only those lettuce heads having predetermined size and firmness.

It is another object of the invention to provide mechanized lettuce harvesting apparatus which accurately positions the operative components relative to the lettuce head being harvested regardless of variations in the terrain along the row of lettuce.

It is yet another object of the invention to provide a harvesting apparatus which gently handles the lettuce so as to avoid the damage thereof.

Yet another object of the invention is to provide lettuce harvesting apparatus reliably operable to select mature heads regardless of the size and firmness of the head to be selected.

Still another object of the invention is to provide a lettuce harvesting apparatus with a lifting conveyor which keeps the sensed heads aligned and positively holds the heads until they reach their destination.

These objects are accomplished in accordance with a preferred embodiment of the invention by harvesting apparatus which is supported by a frame connected with a vehicle. The frame is supported at its lower end by a skid which rests on the ground and it its upper end by parallelogram linkage which is mounted on the vehicle. A knife is pivotally mounted on the skid and is movable laterally to sever lettuce heads at their roots. Since the skid rests on the ground, the skid gauges the height of the knife relative to the ground.

A sensing mechanism is provided which employs a pair of opposed rollers driven at a surface speed corresponding to the speed of forward movement of the vehicle. The rollers are mounted adjacent the ends of a pair of arms which allow the rollers to swing apart from each other as the vehicle moves along the row and the lettuce heads pass between the rollers. A constant force spring extends between the arms to insure that an accurate firmness selection is made regardless of the size of the head. A limit switch activates a hydraulic actuator to swing the knife laterally, thereby severing the adjacent head when the rollers are displaced apart sufficiently to indicate that the head has the proper firmness and size.

A lifting conveyor is also mounted on the frame and positioned behind the rollers to transport severed lettuce heads for subsequent handling. The conveyor includes a pair of facing endless conveyor belts which are driven at the same surface speed as the speed of the vehicle. These belts include outwardly projecting fingers which positively hold the severed lettuce head therebetween. The conveyor belts are supported in a frame which includes belt engaging feet which urge the lower edges of the belts toward each other at a position above the lettuce growing height to prevent the accidental loss of severed heads travelling therein. The conveyor frame is also laterally shiftable to follow accurately the lettuce rows and to engage the lettuce heads positively even if slightly misaligned.

DESCRIPTION OF THE DRAWINGS

This preferred embodiment is illustrated in the accompanying drawings in which:

FIG. 2 is a side elevational view of the harvesting apparatus;

FIG. 3 is a top plan view of the harvesting apparatus with the lifting conveyor shown partially by phantom lines;

FIG. 7 is a side elevational view of the conveyor assembly;

FIG. 8 is a top plan view of the drive portion of the conveyor assembly as viewed along the lines 8—8 of FIG. 7; and FIG. 9 is a cross-sectional view of the conveyor assembly taken along the lines 9—9 of FIG. 7.

DETAILED DESCRIPTION OF THE PREFERRED EMBODIMENT

Figure 1:
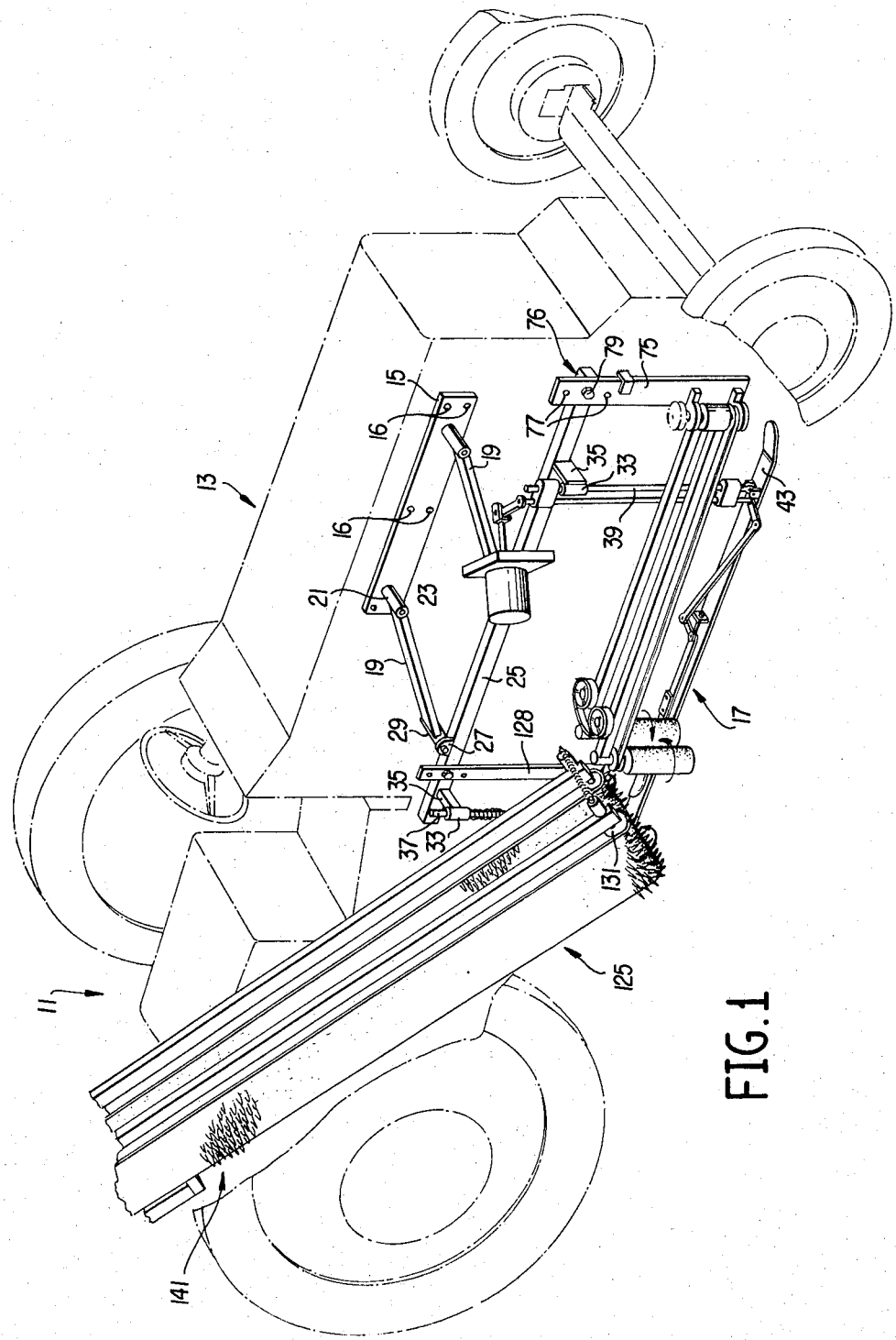
FIG. 1 is a perspective view of the lettuce harvesting apparatus mounted on a conventional tractor.

Referring to FIG. 1, the harvesting apparatus 11 is mounted on a self-propelled vehicle 13, such as a conventional farm tractor. The apparatus could also be suitably mounted on a vehicle adapted for towing by a tractor. A plate 15 is secured to the tractor body by bolts 16 and serves to support a skid and knife assembly 17. Two arms 19 are pivotally mounted on the plate 15 by bushings 21 which are journalled on pins 23 projecting outwardly from the plate 15. The assembly 17 includes a bar 25 on which projections 27 are provided. The lower end of each arm has a bushing 29 which is journalled on the projection 27 by a pin 31. The arms 19 are arranged to provide a parallelogram linkage which maintains the bar 25 parallel to the plate 15 as the bar 25 moves vertically.

A pair of sleeves 33 are spaced from and secured to the bar 25 by means of support posts 35. The sleeves 33 slidably receive rods 37 and 39 which extend downwardly therefrom. These rods are of a generally cylindrical shape and are suitably hinged at 41 to skid member 43. A collar 45 is attached to the rod 37 near its lower end. A compression spring 47 encircles the rod 37 and extends between the lower surface 46 of the sleeve 33 and the collar 45. An additional collar 51 is secured to the rod 37 above the sleeve 33 to limit downward movement of the rod 37, as shown in FIG. 2. A corresponding collar 51 is also provided on the front rod 39 above sleeve 33. The position of the collars 51 along the respective rods 37 and 39 may be changed to adjust the skid height relative to the bar 25.

A knife 53 is normally arranged in superimposed relation with skid member 43. The knife is secured to an arm 55 which is pivotally supported on a bearing member 57. The bearing member 57 includes an arm 59 having a flange which bears against one side of the bracket 61. The arm extends through the slot in the bracket and a nut 63 is threaded on the screw portion of the arm 58 to clamp the arm securely to the bracket. The bearing member 57 forms the journal for a shaft to which the arm 55 and a crank 65 are secured.

The plane in which the knife swings may be inclined upwardly from the horizontal by rotating the arm 59 of the bearing member 57 relative to the bracket 61. For example, if the lettuce in each row is growing on top of a dome of earth, it is necessary to cause the knife to swing in an upwardly inclined plane so that it will strike the lettuce plant at the top of the dome. This adjustment is conveniently made by means of the nut 63 on the bearing member 57.

As shown in FIGS. 2 and 3, a pneumatic or hydraulic actuator 71 is supported on the bar 25 for selectively swinging the knife 53 relative to the skid member 43. An upright pivot shaft 73 is journalled on the front rod 39. The plunger in the actuator 71 is connected with a lever arm 74 secured on the pivot shaft 73. At its lower end, the pivot shaft 73 is provided with a lever arm 76. An adjustable connecting rod extends between the lever arm 76 and the crank 65. The connecting rod 67 includes a threaded sleeve 69 which permits adjustment of the angular position of the knife relative to the skid and also compensates for changes in the angular position of the bearing member 57 relative to the skid.

The skid moves toward the right, as viewed in FIGS. 1 and 2, as the tractor advances along the row of lettuce plants in a harvesting direction and the skid normally slides along the surface of the ground. The rear end of the skid is normally biased downwardly by the aforementioned spring 47. The skid has a relatively large contact area which prevents the excessive penetration of the skid and knife into the soil. Also, the skid accurately locates the knife 53 relative to the height of the growing bed. The skid also shields and protects the knife 53 when it is not in its extended cutting position. Suitable means (not shown) are provided to lift the bar 25 and the skid 43 out of contact with the ground when the harvesting apparatus is not in use.

A maturity sensing assembly is suspended from a mounting plate 75 which is secured to the forward end of the bar 25 which moves vertically with the bar. This plate 75 is provided with a series of holes 77 for receiving a bolt 79 in one of the holes to allow adjustment of the height of the plate relative to the bar 25. The sensing assembly includes a pair of bearings 85 which are suitably secured to the mounting plate 75, as shown in FIG. 3. Arms 89 and 91 extend rearwardly from the respective bearings which allow the arms to swing toward and away from each other about a vertical axis. The arms 89 and 91, which may be of tubular steel, each support a roller 93 which is suspended from a bearing 94. The central axis of the rollers 93 is positioned generally vertical and the rollers have a diameter of about three inches including a foam rubber coating having a thickness of about one half inch. The rollers are preferably driven by means of pulleys 95 and belts 97. The belts 97 extend over pulleys 95 on the bearing 85 and are driven from the tractor, or other suitable source of power. Preferably, the surface speed of the rollers 93 is adjusted to correspond to the forward speed of the tractor. The rollers also are driven in opposite directions, as shown by the arrows in FIG. 3.

A pair of spools 101 are rotatably mounted on the arms 89 and 91. A constant tension spring 105 is coiled on each of the spools 101 to apply a spring bias urging the two arms toward one another with a spring force that remains constant regardless of the distance between the rollers 93. Normally, the rollers 93 are spaced apart by an adjustment rod 111 which has a follower 113 at its end that is positioned to engage the arm 89. The rod 111 is threaded into a collar 115 on the arm 91. By rotating the rod 111, the minimum spacing between the rollers 93 can be adjusted. The spring 105 will normally bias the rollers toward one another until the follower 113 is in contact with the arm 89.

Figure 4:
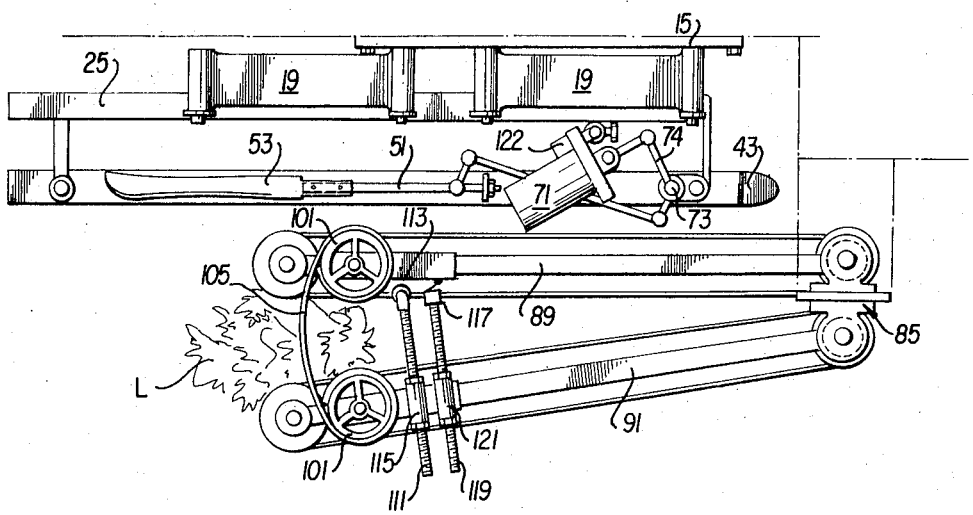
FIG. 4 is a top plan view of the apparatus showing a lettuce head passing between the rollers just prior to the cutting operation.

A micro switch 117 is mounted on a threaded rod 119 adjacent the rod 111, as shown in FIG. 4. The rod 119 extends through a threaded collar 121, so that the position of the micro switch relative to the follower 113 can be adjusted by rotating the rod 119. The micro switch is normally closed, but when the micro switch 117 engages the arm 89, it is open. Since the spring 105 continually urges the arms 89 and 91 toward the position shown in FIG. 3, the micro switch 117 remains open unless the arms move apart. When a mature and firm lettuce head causes the arms 89 and 91 to separate sufficiently to close the micro switch 117, a solenoid 122 which is controlled by the micro switch 117, causes the actuator 71 to operate the knife 53. The position of the follower 113 is adjusted to maintain the micro switch 117 open while small lettuce heads pass between the rollers 93. Also, soft and immature heads of sufficient size do not have sufficient firmness to overcome the constant force applied to the spring 105, and therefore the knife will not be operated to harvest such heads when they pass between the rollers. A spring force of about 14 pounds for the spring 105 has been found to be suitable for lettuce harvesting.

An extension spring (not shown) may be provided in the arms 89 and 91 in order to absorb the load on the rollers 93 as the rollers are separated. The arms 89 and 91 may, for example, be constructed of one inch square tubing which is slidably received within a one and one-quarter inch square tubular sleeve 123 (FIG. 3). Preferably, the spring is mounted inside the arms and sleeves and urges the pulleys 95 on each arm 89 and 91 apart to maintain the proper belt tension.

A lifting assembly 125 as shown in FIGS. 7 to 9, is positioned behind the rollers 93 for carrying a severed lettuce head from the ground to an elevated position for subsequent processing. The lifting assembly 125 includes a tubular frame portion 127 which is provided with a pair of endless conveyor belts 129. The belts 129 extend over a guide roller 131 on the lower portion of the frame 127 and over a roller 133 at the upper end of the frame. The frame also includes a longitudinal adjustment to insure that the belts 129 are sufficiently tensioned.

The frame 127 and the belts 129 are mounted on the bar 25 by means of a support 128 (FIG. 1). The lower end of the lifting assembly, where the rollers 131 are located, is positioned relative to the ground by the skid assembly 17 through the bar 25. Vertical adjustments may be provided to raise and lower the assembly 125 relative to the bar 25 in any suitable conventional manner.

A guide mechanism 135 may be provided at the upper end of the lifting assembly 125. This mechanism includes an angled rod 137 which is slidably journalled within a guide bushing 139 suitably secured to the tractor frame at 141 (FIG. 1). Any vertical adjustments transmitted through the skid and bar 25 causes the rod 137 to move up or down within the bushing 139.

In addition, the mounting assembly 128 may be provided with lateral adjusting means as well as the vertical adjusting means. The bushing 139 enables the lower portions of the frame member 127 to swing outwardly or inwardly depending on a desirable lateral spacing from the tractor body. It is advantageous to provide a certain amount of lateral play at the mounting 128 so that the conveyor belts 129 may follow the plant rows without damage to the lettuce plants that are not harvested.

The belts 129 are driven by a conventional pulley or chain drive 141 which may be suitably driven from the main tractor drive or from a separate hydraulic motor. This drive 141 usually includes a right angle drive gear box 143 to insure that the belts are driven at the proper speed. Most importantly, the belts 129 are driven at ground speed and in opposite directions to one another with the surfaces moving upwardly toward the gear box 143.

Additionally, a portion of the frame 127 at 145 includes adjusting guides 147 located on the inner and bottom side of each frame. These guides 147 include angled feet 149 which frictionally engage the rear surfaces of the belts 129. These guides serve to urge the bottom of the belts 129 toward the centerline of the lifting assembly 125 and substantially eliminate the possibility of lettuce heads falling through the generally parallel conveyor frames during the head lifting operation. These guides at 145 are positioned at a height above that of the lettuce head growing height H, so that immature heads are not inadvertently damaged as they pass between the belts 129. For this purpose the guides 145 may be positioned along a tubular frame section 146 at desirable positions depending on field harvesting parameters. Any conventional locking device, such as a set screw acting against the frame 146, may be used to keep these guides in their proper locations.

Figure 6:
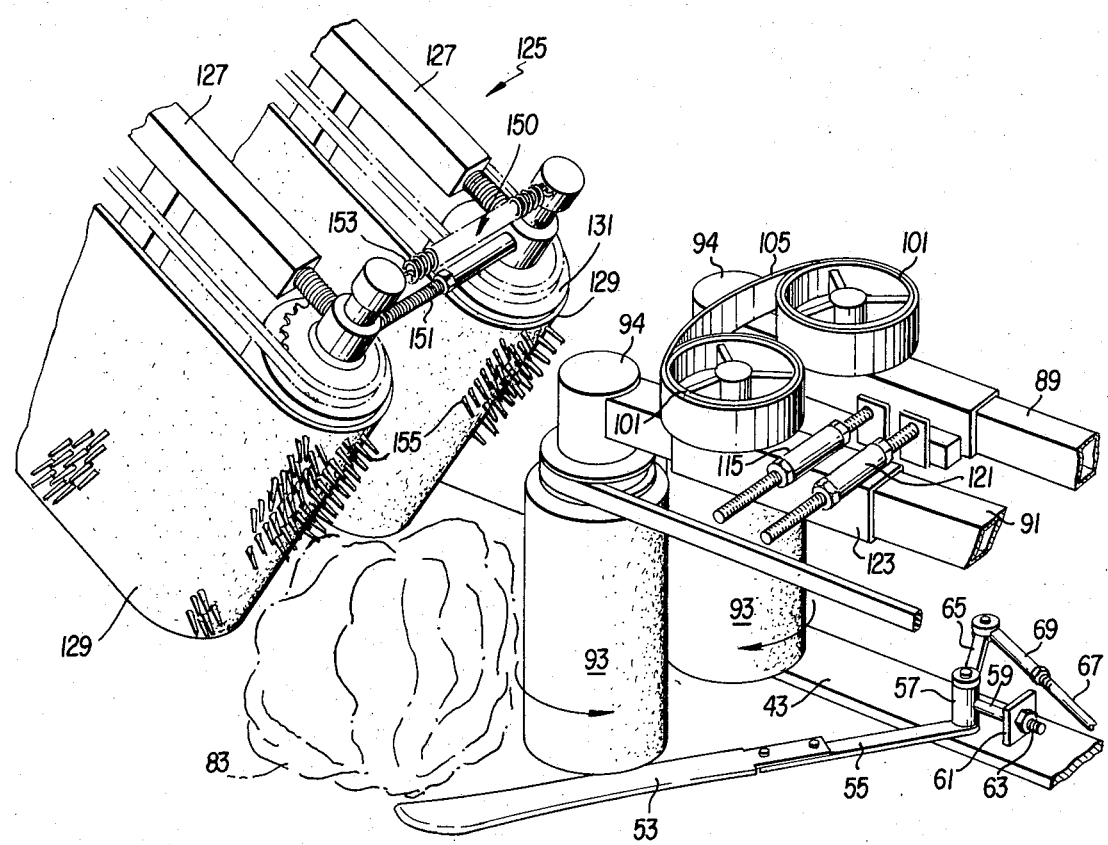
FIG. 6 is a detail perspective view of a lettuce head having been severed by the cutter and prior to being picked up by the conveyor assembly.

At the lower end of the assembly 125 an adjustment mechanism 150 (FIG. 6) is provided to set the spacing between the belts 129. This mechanism may include a threaded rod and roller mechanism 151 which is similar in operation to the adjustment device 111 associated with the sensing assembly 81. This mechanism 151 thus keeps the belts 129 from coming together any closer than a predetermined distance but allows the belts to separate in response to unevenly planted rows of lettuce heads. A spring 153 secured to each frame 127 causes the belts to return to their preset distance after each separation from one another.

The belts are preferably angled upwardly at about 45° and feed severed heads to a subsequent handling operation. This operation may include additional conveyors of in-the-field packing apparatus.

The belts also are preferably provided with a plurality of rubber fingers 155 which project outwardly therefrom. This "scrubber belt" arrangement has been found to be most satisfactory in the positive holding of the lettuce heads. These fingers 155 may be about 1 ¼ inches long and be integrally molded on the belts 129.

OPERATION AND SUMMARY OF ADVANTAGES

Figure 5:
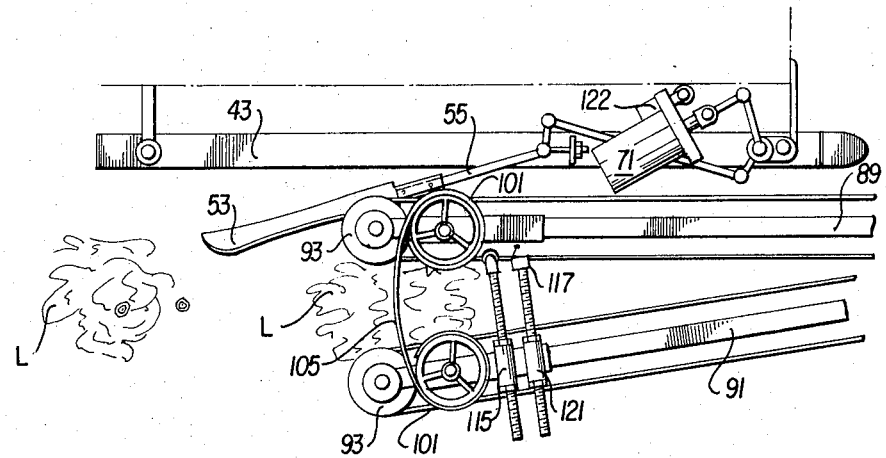
FIG. 5 is a top plan view of the apparatus as in FIG. 4, but showing the knife being activated to sever a mature lettuce head.

In operation, the tractor carrying the harvesting apparatus 11 moves along a row in which both mature and immature lettuce plants are growing. The lettuce heads pass between the rollers 93. The padded rollers 93 pivot outwardly away from one another when a sufficiently mature head of adequate size passes between the rollers. The heads must be large enough and firm enough to overcome the constant force exerted by the spring 105. The rollers 93 are powered and kept constantly rotating at ground speed with their opposing surfaces travelling in the same direction rearwardly toward the lifting assembly 125. Separation of the rollers 93 by a predetermined amount causes the micro switch 117 to close and thereby operate the hydraulic actuator 71 to swing the knife 53 laterally from the position shown in FIG. 4 to the position shown in FIG. 5. The knife cleanly cuts the selected head at its root or butt. The knife is maintained at the proper cutting level by the skid 43 which is in contact with the ground.

As soon as the head L is severed from its root, the endless belts 129 of the lifting assembly 125 grasp the severed head and transport it from its ground position to another crop conveyor or packing trailer. The belts rotate at ground speed with their opposing faces moving upwardly. Since the belts are advancing at the same speed as the tractor, substantially no relative movement occurs between unsevered lettuce plants and the belts. Thus, the immature plants are not harmed and may be harvested later. Also, the conveyors are capable of moving laterally to follow the center line of the row without damaging the plants. Generally, all of the heads move upwardly between the belts 129 with their butt ends downwardly. This greatly facilitates any subsequent packaging operation.

The sensing assembly 81, skid and knife assembly 17 and the lifting assembly 125, are advantageously kept at the proper relative location to one another by means of the bar 25 and linkages 19 associated therewith. This assembly gauges the travelling height of the sensor unit and the lifter unit relative to the skid. Additionally, the adjustment features provided on each of the separate assemblies adequately compensate for a variety of growing parameters.

While a single row harvesting unit is employed in the preferred embodiment, it is contemplated that more than one row of lettuce may be harvested at a time without varying substantially from the inventive concepts disclosed herein. Also, while lettuce is harvested with the described machine, slight modifications without departing from the novelty herein could be made to accommodate a variety of crops which present similar harvesting problems.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Harvesting apparatus comprising:
   vehicle mounting means;
   a frame;
   link means movably connecting said frame with said mounting means;
   knife means on said frame for severing mature lettuce at a butt end location generally adjacent the ground;
   sensing means on said frame for actuating said knife means between said sensing means and the ground immediately therebelow in response to crop density and size;
   lifting means on said frame for conveying said severed lettuce from the ground for subsequent handling;
   said knife means and said sensing means and said lifting means cooperating to select and harvest only those lettuce heads having a predetermined density and size.

2. The apparatus according to claim 1 wherein said frame includes:
   ground engageable skid means for accurately positioning said knife means relative to the ground; and said knife means being mounted on said skid means.

3. The apparatus according to claim 1 wherein said sensing means includes
   arm means for supporting said sensing means;
   substantially cylindrical opposed rollers rotatably mounted
   adjacent one end of said arm means, said arm means including spacing means biasing said rollers toward each other, and
   switch means on said arm means for actuating said knife means in response to movement of said rollers apart from each other a distance greater than a predetermined distance.

4. A crop harvesting device comprising:
frame means having mounting means adjacent one end thereof for attachment to a vehicle and having a second end thereof adjustable generally vertically relative to the ground for supporting said crop harvesting device;
sensing means secured to said second end for evaluating crop size and firmness;
knife means extensible from said second end in a plane generally parallel to said ground and actuated by said sensing means to sever said crop between said sensing means and said ground immediately therebelow; and
lifting means connected to said second frame end for conveying said severed crop for subsequent handling.

5. A vehicle mounted lettuce harvesting apparatus comprising:
adjustable connecting means secured to said vehicle for supporting said harvesting apparatus;
skid means attached to said connecting means and having a ground engageable surface on the lower side and a support surface on the upper side;
knife means mounted on said support surface and including a knife extensible generally horizontally to the ground and outwardly from a position above said skid means for cleanly cutting the lettuce at its root;
said knife being pivotally mounted to said skid means and swinging outwardly in a direction of vehicle travel;
frame means attached to said connecting means and movable with said skid means;
a sensing apparatus mounted on said frame means, said sensing apparatus comprising substantially cylindrical opposed roller means mounted adjacent a first end of said frame means for movement toward and away from one another to allow said lettuce to pass therebetween;
said roller means being biased toward one another with a constant force;
means for rotating said roller means at ground speed and in a direction of machine travel with facing surfaces thereof moving rearwardly;
means for pivoting said knife in response to the movement of said roller means apart from each other a predetermined distance;
endless conveyor belt means spaced generally parallel from one another and rotating about a frame attached to said connecting means for grasping severed lettuce heads therebetween;
means for driving said belt means at ground speed and with facing surfaces thereof moving upwardly, and
adjustment means for aligning said conveyor belt means with the lettuce growing positions.

6. A sensing apparatus for use in vehicle mounted crop harvesting device comprising:
frame means for supporting said sensing apparatus;
substantially cylindrical opposed roller means rotatably mounted adjacent a first end of said frame means for moving relative to one another when said crop passes therebetween.
means for driving said roller means at ground speed and in a direction of machine travel with facing surfaces thereof moving rearwardly; and
means responsive to the movement of said roller means relative to each other for cutting a mature crop between said roller means and the ground immediately therebelow.

7. The sensing apparatus according to claim 6 wherein said frame means includes:
biasing means for applying a constant force urging said roller means toward one another.

8. The sensing apparatus according to claim 7 wherein said frame means further includes:
a pair of outwardly projecting frame members extending adjacent from said vehicle;
pivot means associated with each of said frame members at a second end thereof; and
adjustment means cooperating between said frame members adjacent said first end thereof for normally separating said roller means against bias by a predetermined distance.

9. The sensing apparatus according to claim 8 wherein
said roller means hang downwardly from said frame and comprise rubber coated steel rollers.

10. The sensing apparatus according to claim 9 further including:
switch means responsive to the separation of said rollers beyond said predetermined distance for signalling the selection of a mature crop;
actuator means responsible to said switch means for pivoting a crop cutting knife.

* * * * *